United States Patent Office 2,788,873
Patented Apr. 16, 1957

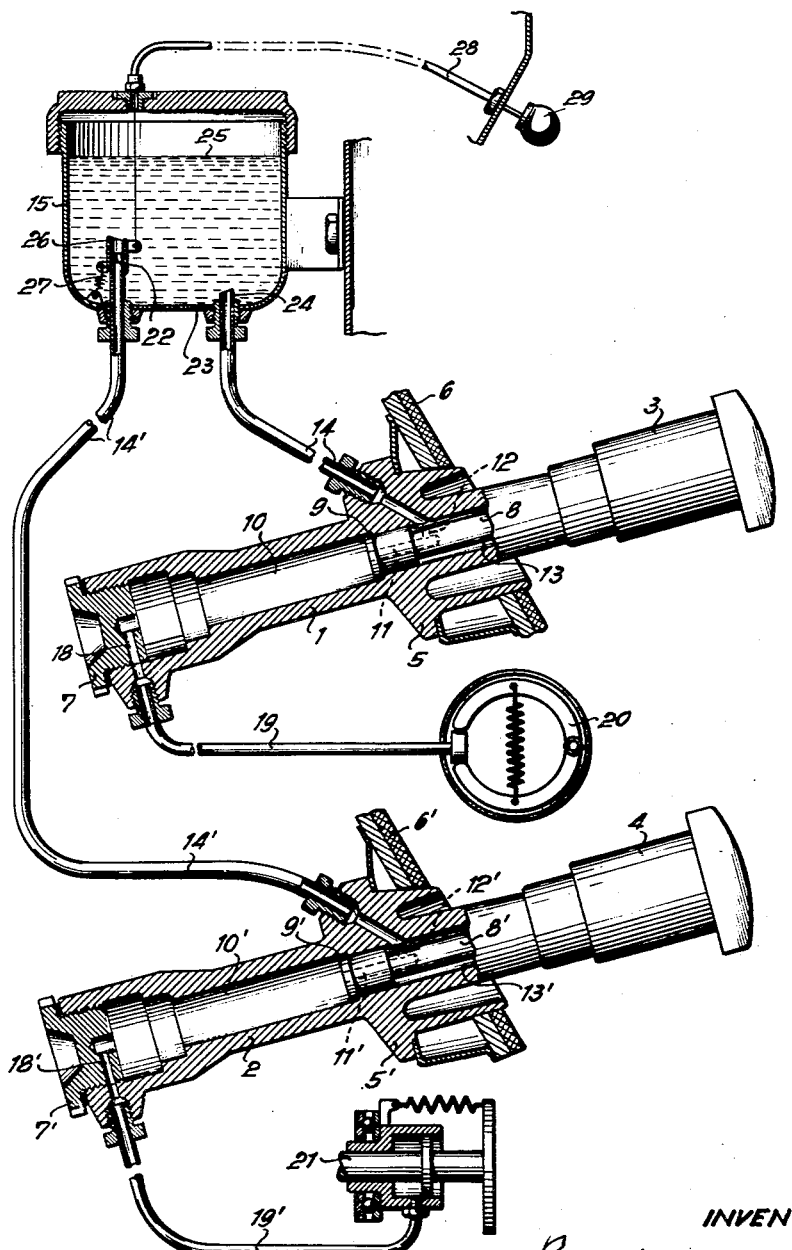

2,788,873

HYDRAULIC MECHANISM FOR OPERATING THE CLUTCH AND BRAKES OF AUTOMOTIVE VEHICLES AND SAFETY MEANS THEREFOR

Ferdinand A. E. Porsche, Stuttgart, Germany, assignor to Dr. Ing. h. c. F. Porsche K.-G., Stuttgart-Zuffenhausen, Germany Application June 11, 1954, Serial No. 436,136

Claims priority, application Germany July 1, 1953

6 Claims. (Cl. 192—12)

The invention relates to improvements in hydraulic systems for the brakes and the clutch of automotive vehicles in which the pressure medium is taken from a common storage container, and more particularly to such a system including safety means.

In automotive vehicles in which the brakes and the clutch are hydraulically operated, it is known to provide a common storage container from which the pressure medium passes through separate pipes into the cylinders for the brakes and the clutch. Because of the likelihood of leakages in the brake and clutch installations and the fall of the liquid level in the storage container it must therefore be periodically inspected. This matter is left entirely to the driver to judge the state of the container and the efficiency of the installation. If the liquid level in the container becomes too low, the brakes become incapable of operation and may cause an accident. The primary object of the invention is to provide a system of the kind described which includes means for warning the driver or operator of a low level in the container.

A further object is to provide a safety means in a hydraulic system including a common container for the hydraulic fluid supplied to two or more mechanisms of an automotive vehicle.

According to the invention, the running safety of an automotive vehicle is increased by virtue of the fact that the storage container is provided with an arrangement to prevent the flow of pressure medium to the clutch cylinder when the liquid level in the storage container has fallen approximately to a value which is required to maintain the operating efficiency of the brakes. Since the clutch does not operate at a certain low level, the driver immediately becomes aware of and is warned that damage has occurred to the hydraulic installation, although he is still able to brake, which is essential to prevent accidents.

The safety feature or warning arrangement comprises two pipes leading into the storage container and connected respectively to the main brake cylinder and to the clutch cylinder, the end of the pipe connecting the clutch cylinder being situated at a greater distance from the bottom of the container than the end of the pipe leading to the brake cylinder. Maximum safety is thus ensured with minimum expenditure on construction.

A part of the clutch cylinder pipe extending into the storage container may be arranged to be increased by means of a traction member operated from a distance, for example by a Bowden or push-pull cable. This is particularly advantageous if, during travel, damage occurs which cannot immediately be remedied by re-filling the container, since on displacement of the said part of the pipe to decrease its height above the bottom of the container, sufficient pressure medium will flow into the clutch cylinder that the clutch can be operated.

The features of the invention are shown in the accompanying drawing, in which the single figure illustrates by way of example one embodiment of the invention. The figure shows partly in section and diagrammatically a hydraulic brake and clutch arrangement of an automotive vehicle according to the invention, the juxtaposed parts being shown one above the other for the sake of simplicity.

The hydraulic installation shown in the drawing comprises a main brake cylinder 1 and a clutch cylinder 2, which are combined with their respective associated operating members 3 and 4. The master brake cylinder 1 is secured to the foot ramp 6 of the vehicle body and is closed off at its front end by a cover or closure 7. The operating member 3 is connected to a rod 8 which terminates in a displacement piston 9 sliding in the cylinder space or bore 10 of the cylinder 1. The rod 8 has formed therein connecting bores 11 and 12 terminating in a space 13 surrounding a portion of the rod 8 and into which pressure oil or hydraulic fluid is fed through a pipe 14 from a storage container 15. This oil thereafter flows through the bores 12 and 11 into the cylinder bore 10. On operation of the brake pedal or operating member 3, the oil is displaced by the piston 9 and passes into a radial bore 18 in the cover 7, whence it effects, through the pipe 19, the application of the wheel brakes 20.

The structural parts of the clutch cylinder 2 are constructed and arranged in the same manner as those of the brake cylinder 1, and the individual parts are therefore designated by the same reference numerals with a prime. The only difference resides in that the pressure medium in the pipe 19' actuates a disengaging device 21 for the clutch plate.

According to the invention, the pipes 14, 14' leading into the storage container 15 from the respective cylinders 1 and 2 are so arranged that the inlet end 22 of the pipe 14' in the container 15 is at a greater distance from the bottom 23 of the container 15 than the end 24 of the pipe 14 in the container 15. Now, in the event that the liquid level 25 in the container 15 falls too far, i. e., below the inlet 22 of the pipe 14' disengagement of the clutch will become impossible for lack of hydraulic fluid, while the brakes will continue to be fully operative. This result was intentionally brought about in order to draw the driver's attention to the condition of the hydraulic installation. The brakes, which are the most important elements of the vehicle from the standpoint of traffic safety, still remain fully operable, since the entire oil supply below the inlet 22 is available thereto through the inlet 24.

As is shown in the drawing, there is provided on the end 22 of the pipe 14' a sleeve extension 26 which is displaceable upwardly against the action of a spring 27 by a Bowden or push-pull cable 28. When the sleeve 26 is raised, the hydraulic fluid level in the container 15 will be up to the top of sleeve 26 at the time the clutch becomes inoperable because of loss of hydraulic fluid from the system. By slackening the Bowden cable 28, i. e. by pushing it on the knob 29, the slidable sleeve extension 26 is pulled downwards by spring 27, so that fluid will flow into pipe 14' and the clutch can be engaged or operated, at least for a time, despite the fact that no hydraulic fluid is available for re-filling the container 15.

It is to be understood that the invention is not limited to the embodiment illustrated by way of example. Thus, for example, the pipe terminating at a greater distance from the bottom of the container may be replaced by other means adapted to accomplish the same results. According to the invention the results thereof may also be achieved by the provision of equivalent means if the brake cylinder and the clutch cylinder are combined to form a single unit, this means acting in response to a predetermined loss of hydraulic fluid to warn the driver and at the same time maintain, or not interfere with the operation of the brake-operating mechanism.

What I claim is:

1. In an automotive vehicle including a hydraulic system for operating at least the brakes of the vehicle, said hydraulic system including a storage container for hydraulic fluid, a master cylinder for operating the vehicle brakes, a pair of conduits leading into the storage container, one of which opens into the container at a relatively low level therein and is connected to said master cylinder for supplying hydraulic fluid thereto from the storage container, one end of said other conduit opening into said storage container at a level somewhat higher than the inlet to the conduit leading to said master cylinder so that in the event of a fall of liquid level in said storage container the inlet of said other conduit will be deprived of liquid before the conduit leading to said master cylinder, and separate means normally supplied with hydraulic fluid by said other conduit, the discontinuance of the flow of hydraulic fluid from the container to said separate means serving as a warning to the driver of the vehicle that the liquid level in the storage container has fallen to a point such that liquid is not supplied to the inlet of said other conduit.

2. An automotive vehicle as claimed in claim 1, including means for changing the effective level at which liquid in said storage container flows into said other conduit, and means for manually operating said means for changing the effective level at which liquid in said storage container flows into said other conduit.

3. In an automotive vehicle including hydraulically-operated brakes and clutch, a common storage container for hydraulic fluid, hydraulic cylinders for respectively operating the brakes and clutch, means for separately conducting hydraulic fluid from the container to the respective cylinders, and means arranged to discontinue the flow of hydraulic fluid to the cylinder for operating the clutch when the level of the fluid in the container falls to a predetermined level, the means for conducting hydraulic fluid to the hydraulic cylinder for the brakes being arranged to conduct hydraulic fluid from the body of hydraulic fluid in the container below said predetermined level, whereby the discontinuance of the supply of hydraulic fluid to the cylinder for operating the clutch serves as a warning to the driver of the vehicle that the level of the hydraulic fluid in the container has fallen to said predetermined level while there is adequate hydraulic fluid in the container below said level for the safe operation of the brakes of the vehicle.

4. An automotive vehicle as claimed in claim 3, in which the means for conducting hydraulic fluid from the container to the hydraulic cylinder for operating the brakes opens into the container at a level appreciably below that of the means for conducting hydraulic fluid from the container to the cylinder for operating the clutch.

5. An automotive vehicle as claimed in claim 4, in which the means for conducting hydraulic fluid from the container to the cylinder for operating the clutch includes a pipe extending upwardly from the bottom of the container to a predetermined point above the bottom of the container, said pipe having an open end for the inflow of hydraulic fluid in the container, a sleeve extension on and normally projecting above the open end of said pipe, and means operable by the driver of the vehicle for displacing said sleeve extension for reducing the effective level of the inlet opening to said pipe.

6. In an automotive vehicle including hydraulically-operated brakes and another hydraulically-operated mechanism, manually-controlled hydraulic actuating means for respectively operating the brakes and said other mechanism, a common storage container for hydraulic fluid, and means for conducting hydraulic fluid from the storage container respectively to the manually-controlled means, said last-mentioned means including means for supplying hydraulic fluid from the container for operating the vehicle brakes in preference to supplying hydraulic fluid for the operation of said other mechanism as the level of the hydraulic fluid in the container falls to a predetermined level, whereby the discontinuance of the supply of hydraulic fluid for the operation of said other mechanism provides a warning to the driver of the vehicle that the level of hydraulic fluid in the container has fallen to said predetermined level and that the hydraulic system of the vehicle requires attention.

References Cited in the file of this patent
UNITED STATES PATENTS

| | | |
|---|---|---|
| 1,938,979 | Sawtelle | Dec. 12, 1933 |
| 2,625,267 | Alexander | Jan. 13, 1953 |